Oct. 13, 1925.　　　　　　　　　　　　　　　1,557,514
F. W. WISE
CLAMP
Filed June 12, 1922　　2 Sheets-Sheet 1

INVENTOR
Fred W. Wise
BY
Fred C. Matheny
ATTORNEY

Oct. 13, 1925.  
F. W. WISE  
CLAMP  
Filed June 12, 1922     2 Sheets-Sheet 2
1,557,514
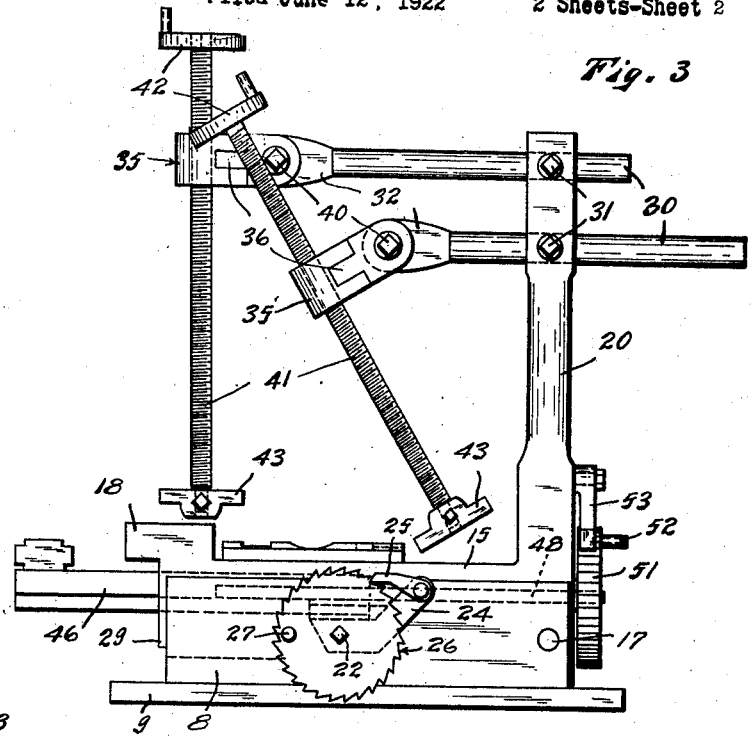
Fig. 3
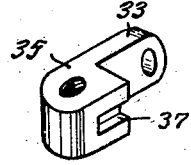
Fig. 5
Fig. 6
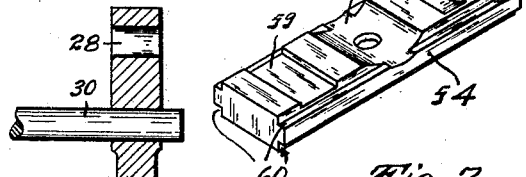
Fig. 7
Fig. 4
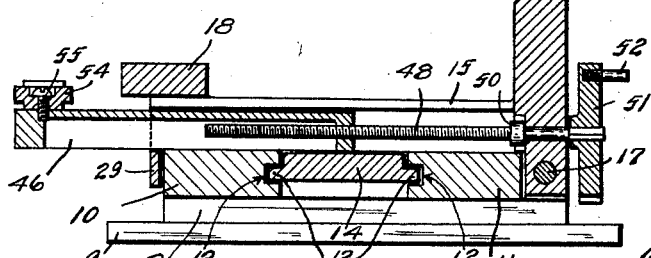
INVENTOR  
Fred W. Wise  
BY  
Fred C. Matheny  
ATTORNEY Patented Oct. 13, 1925.

1,557,514

UNITED STATES PATENT OFFICE.

FRED W. WISE, OF KIRKLAND, WASHINGTON, ASSIGNOR, BY MESNE ASSIGNMENTS, OF ONE-HALF TO OSCAR E. HIGGINS, OF SEATTLE, WASHINGTON.

CLAMP.

Application filed June 12, 1922. Serial No. 567,587.

*To all whom it may concern:*

Be it known that I, FRED W. WISE, a citizen of the United States, residing at Kirkland, in the county of King and State of Washington, have invented a certain new and useful Improvement in Clamps, of which the following is a specification.

My invention relates to improvements in clamps or racks for holding articles of various shapes and sizes in different positions in which said articles may be conveniently worked on and the object of my invention is to provide clamp mechanism of this nature that is especially well adapted for holding material that is to be welded, said clamp mechanism being capable of a wide range of adjustments whereby it may be used to hold pieces of material of substantially any size and shape in the proper position for welding.

In welding broken metal parts it is common practice to hold the pieces that are to be welded by placing bricks around the same and by applying ordinary screw clamps to the broken parts to hold them together in the proper position for welding. When the broken parts are of peculiar and irregular shape it is often difficult and sometimes impossible to hold the same successfully in this manner.

I have devised a holding rack or clamp that is capable of being quickly and easily adjusted to securely clamp and hold any pieces of material that are to be welded regardless of the shape of the same, thus affecting a saving in the time required to perform many pieces of ordinary welding work and making it possible to accurately hold and weld many peculiarly shaped pieces that could not otherwise be held for welding.

Further objects of the invention are to provide clamp mechanism of this nature that is strong and simple in construction, easy to operate, not expensive to manufacture and that will hold the work firmly and accurately during the process of welding so that the work can not become warped or twisted out of shape.

With the above and other objects in view as will be apparent from the following description, the invention consists in the novel construction adaptation and combination of parts of a welding rack as will be more clearly hereinafter described and claimed.

In the accompanying drawings Figure 1 is a plan view of a welding rack constructed in accordance with my invention.

Fig. 3 is a view in side elevation of the same.

Fig. 4 is a sectional view on broken line 4—4 of Fig. 1.

Figs. 5, 6 and 7 are perspective views of details of the invention.

Like reference numerals designate like parts throughout the several views.

Figure 1:
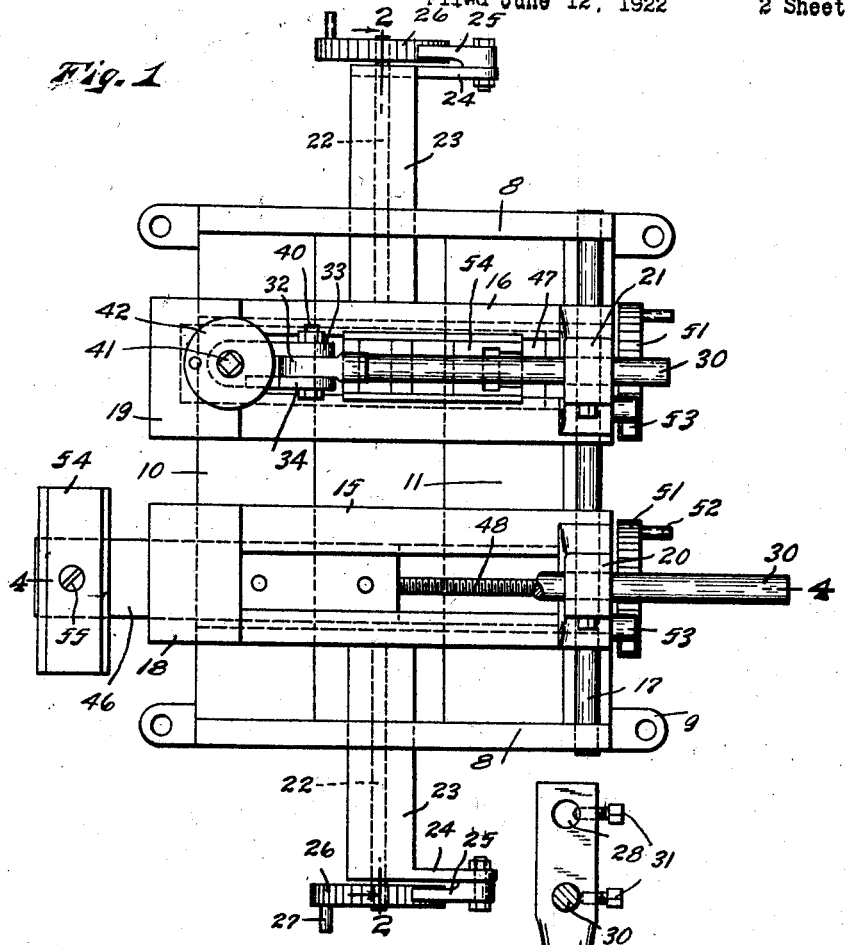

Referring to the drawings I have shown a rectangular frame comprising angular side pieces 8 that are supported on base members 9 and are secured together by two spaced apart cross bars 10 and 11 which are located near the front and rear of the device respectively. The inner edges of the cross bars 10 and 11 are grooved as at 12 to provide trackways for the reception of tongues 13 which are formed on the edges of downwardly protruding portions 14 that are integral with or otherwise rigidly secured to two transversely movable clamp members 15 and 16. The clamp members 15 and 16 have perforations at their rear ends and are guided for movement on a rigid transverse bar 17. Downwardly projecting flanges 29 serve as guides for the front ends of the clamp members 15 and 16.

The transversely movable clamp members 15 and 16 are provided at their forward ends with rigid blocks 18 and 19 that project above the surface thereof and are provided at their rear ends with integral or otherwise rigidly secured upwardly protruding posts 20 and 21.

The clamp members 15 and 16 are arranged to be moved crosswise of the frame by screws 22 that are operatively connected at their inner ends with the clamp members and that project outwardly and are threaded through the sides 8 of the frame. Disposed just above the screws 22 and slidable through suitable slots in the side frame members 8 are guide members 23 whose inner ends are secured to the clamp members 15 and 16 and whose outer ends are provided with brackets 24 that form bearings for the outer ends of the screws 22 and supports whereon pawls 25 may be pivotally mounted, the pawls being arranged to engage with ratchet wheels 26 that are secured on the outer ends of the screws 22. The ratchet wheels 26 are provided with handles 27 by which they may be turned.

The upper ends of the posts 20 and 21 are perforated as at 28 for the reception of shanks 30, set screws 31 being provided for holding the shanks 30 in any adjusted position. The forward ends of the shanks 30 are flattened as at 32 and are arranged to be clamped between the two side plates 33 and 34 of a block 35. One of the side plates 33 is integral with the block 35 and the other side plate 34 is separable from such block and has a shank 36 that is arranged to fit within a groove 37 in said block 35. One or both of the side plates 33 and 34 are provided with studs 38 that are adapted to fit within suitable recesses in the flattened end 32 of the shank 30 whereby the block 35 may be securely locked, by a bolt 40, in any adjusted position on the shank 30.

Threaded through the outer end of each block 30 is a clamp screw 41 having at its upper end a hand wheel 42 by which it may be turned and at its lower end a removable and reversible block 43 that may be used to engage any piece of material that is to be held. One side of each block 43 is preferably plane while the other side has a protruding central portion, as shown, to better adapt the block to fit the peculiar shape of the work that is being held.

The transversely movable clamp members 15 and 16, which are preferably of duplicate construction, are recessed to form guideways for the reception of bars 46 and 47 that are arranged to be moved lengthwise within the clamp members 15 and 16 by screws 48 which screws through the rear ends of the bars 46 and 47 and project rearwardly through the rear ends of the clamp members 15 and 16 at the base of the posts 20 and 21, collars 50 being provided on the inner side of the base of the posts 20 and 21 and ratchet wheels 51 being provided on the extreme outer ends of such screws, said ratchet wheels having knobs 52 by which they may be turned and being normally engaged by pawls 53 which prevent rotation of the same in one direction only. The collars 50 and ratchet wheels 51 serve as thrust members to prevent longitudinal movement of the screws 48.

The bars 46 and 47 are arranged to have blocks 54 secured thereto as by screws 55 in various positions for facilitating the clamping of work. The blocks 54 are preferably each provided on one side with various slots, grooves and depression as indicated by the numerals 56, 57, 58 and 59 in Fig. 7 within which pieces of material certain shapes may be advantageously held while they are being worked on. The opposite sides of the blocks 54 may be plain and flat as shown in the drawings.

Figure 2:
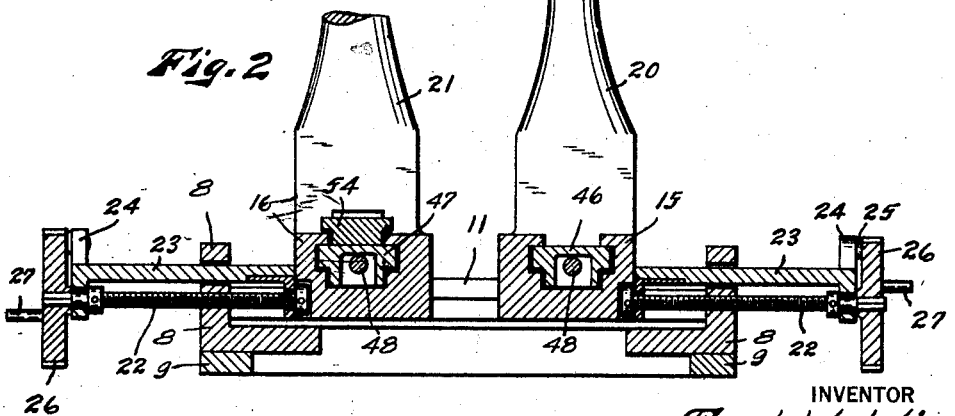
Fig. 2 is a sectional view of the same substantially on a broken line 2—2 of Fig. 1.

The edges of the blocks 54 are grooved as at 60 so that said blocks will fit down into the transversely movable clamp members 15 and 16 when they are secured lengthwise of the bars 46 and 47, see Fig. 2. The blocks 54 may be secured lengthwise of the bars 46 and 47 in adjusted positions as shown on the bar 47 or such blocks may be secured crosswise of the bars 46 and 47 at the outer ends thereof as shown on the bar 46. Either side of the blocks 54 may be turned uppermost.

In operation the transversely movable clamping members 15 and 16 may be adjusted into any desired position crosswise of the frame to clamp and hold pieces of material either between said two clamping members or between either of said clamping members and the adjacent side 8 of the frame or said clamping members may be adjusted to secure a proper rest and support for material that is being held by the clamp screws 41.

The clamp screws 41 may be turned into substantially any angle to facilitate the holding of work and may be fixed in any desired position by tightening the set screws 31 and bolts 40. In Fig. 3 I have shown one of the clamp screws 41 in a vertical position and the other clamp screw inclined rearwardly. When they are not in use the clamp 41 screws and shanks 30 may be removed from the posts 20 and 21 so that they will not interfere with other work.

The bars 46 and 47 which are movable lengthwise in the clamping members 15 and 16 may have the blocks 54 secured thereto in different positions so that said blocks may be caused to cooperate with other parts in clamping and holding pieces of work: For instance the work may be placed on the blocks 54 in any of the recesses 56, 57, 58 or 59 and held by the clamp screws 41 or the work or parts of the same may be clamped between the blocks 54 and the integral block members or shelves 18 and 19 on the forward ends of the clamping members 15 and 16, or between the blocks 54 and the base portions of the posts 20 and 21.

The ratchet members on the ends of the several screws are arranged so that they will prevent the screws from turning to loosen the clamps after the clamps have been tightened on the work.

From the preceeding description it will be seen that all of the parts of this device cooperate in such a manner as to make it possible to securely and accurately clamp and hold either one or a plurality of pieces of material of almost any shape and size.

If desired bricks may be used in connection with this device for conserving the heat and for helping to hold parts that are being welded.

The device is primarily intended for use as a clamp for material that is being welded, but it is also adapted for use as a vise in holding work for other purposes, and the blocks 18 and 19 may be made solid enough to serve as anvils for light work.

The guide members 10 and 11, the transverse rod 17 at the rear and the guide flanges 29 at the front serve to prevent the clamp members 15 and 16 from being twisted or thrown out of line and insure that such clamp members will always move smoothly and without locking or binding.

The foregoing description taken in connection with the accompanying drawings clearly discloses the plan of construction and method of operation of my clamping device but, while I have shown and described what I now consider to be the preferred form of the invention, it will be understood that the disclosure is merely illustrative and that numerous changes in the form, dimensions, and arrangement of parts of the same may be made without departing from the scope and spirit of the invention.

What I claim is:

1. In a device of the class described, a normally horizontal frame, two relatively long clamping members extending across said frame and supported in parallel relation for sidewise movement toward and away from each other, independent screw means for moving each of said clamping members sidewise, a post projecting upwardly at the rear end of each of said clamping members, a shank supported for rotary and longitudinal adjustment crosswise of each of said posts, and clamping means on the forward end of each of said shanks.

2. A device of the class described embodying a frame, clamping members guided for horizontal movement on said frame, posts projecting upwardly from said clamping members, shanks rotatable in said posts and projecting at right angles therefrom, and clamp screws operatively supported by said shanks.

3. A device of the class described embodying a frame, two clamping members guided for horizontal movement toward and away from each other on said frame, rigid posts projecting upwardly from said clamping members, and clamp screws supported by said posts for universal movement above said clamping members.

4. A device of the class described embodying a frame, two clamping members guided for horizontal movement toward and away from each other on said frame, posts rigid with said clamping members and projecting upwardly therefrom, horizontal shanks rotatably supported in said posts, blocks pivotally connected with the ends of said shanks, and clamp screws carried by said blocks, said rotatable shanks and pivotally connected blocks affording substantially universal movement of said clamp screws.

5. A holding device of the class described embodying a frame, clamp screws supported for universal movement above said frame, means for locking said clamp screws in a fixed position, and removable and reversible work-engaging elements provided for the lower end of said clamp screws.

6. A device of the class described embodying a frame, parallel clamping members movable toward and away from each other on said frame, blocks rigid with the forward ends of said clamping members and projecting above the plane of the same, bars guided for movement lengthwise within said clamping members and clamping blocks arranged to be removably secured to said bars in different positions.

7. A clamp for holding material to be welded, comprising a frame, clamping members guided for parallel movement toward and away from each other on said frame, screws for moving said clamping members, blocks rigid with the forward ends of said clamping members and projecting above the plane of the same, bars guided for movement lengthwise within said clamping members, screws for moving said bars, and removable clamping blocks arranged to be adjustably secured to said bars, said clamping blocks being recessed for the reception of pieces of material of various shapes.

8. A clamp for holding material to be welded, comprising a frame, clamping members guided for parallel movement toward and away from each other on said frame, screws for moving said clamping members, releasable ratchet means for preventing rotation of said screws in one direction, blocks rigid with the forward ends of said clamping members and projecting above the plane of the same, bars movable lengthwise within said clamping members, screws for moving said bars, releasable ratchet means connected with said screws, removable clamping blocks arranged to be adjustably secured to said bars, rigid posts protruding upwardly from the rear ends of said clamping members, shanks rotatably supported by said posts in parallel relation with and spaced above said clamping members, blocks pivotally connected with the ends of said shanks and clamp screws carried by said blocks.

9. In a clamping device of the class described, a frame, horizontal clamping members movable on said frame, rigid posts extending upwardly from said clamping members, shanks arranged at right angles to said posts and supported by said posts above said clamping members and longitudinally adjustable relative to said posts, and clamping means on said shanks.

10. In a device of the class described, a frame, a plurality of relatively long horizontal clamping members on said frame, means supporting said clamping members in parallel relation and guiding said clamping members for sidewise movement toward and away from each other, and clamping blocks rigidly supported for lengthwise adjustment along the tops of said clamping members.

Seattle, Washington, May 24th, 1922.

FRED W. WISE.